No. 787,317. PATENTED APR. 11, 1905.
J. H. VAN HORN.
AUTOMATIC FISHING REEL.
APPLICATION FILED OCT. 24, 1904.
2 SHEETS—SHEET 1.
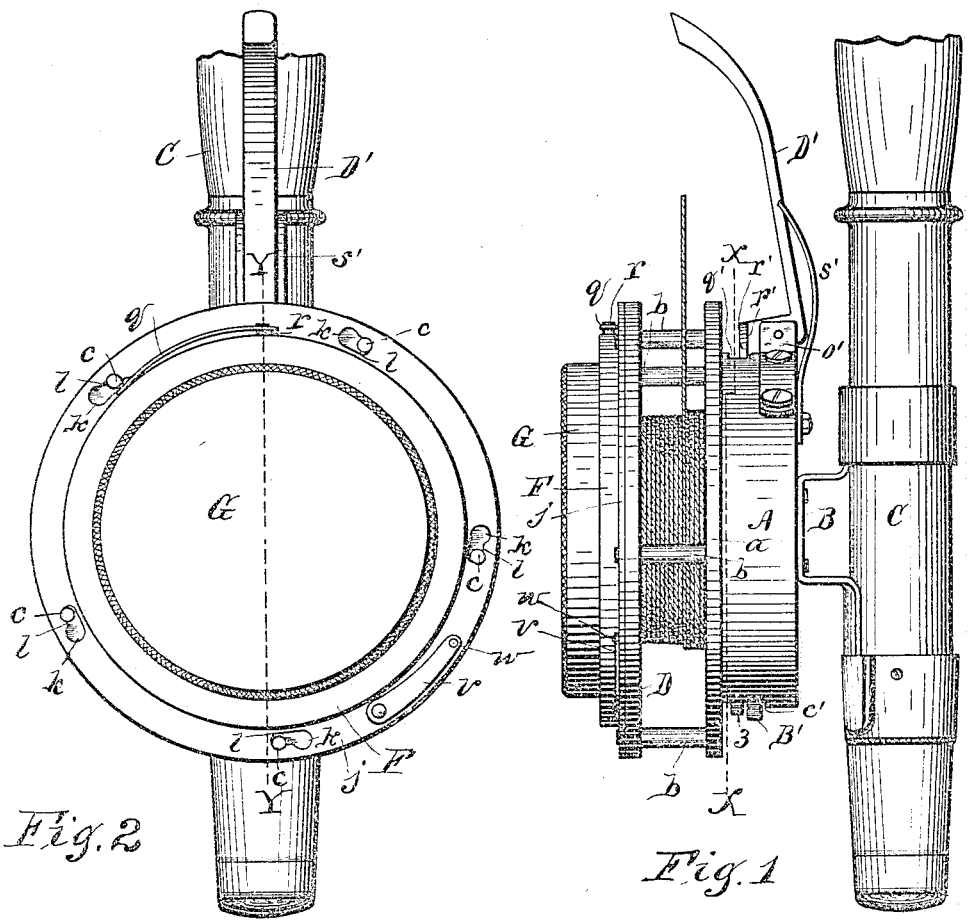
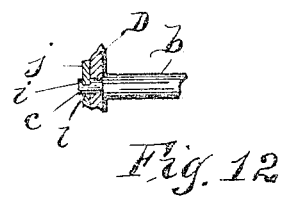
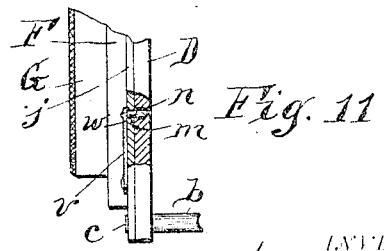
WITNESSES:
INVENTOR
John H. Van Horn
By E. Laass
his ATTORNEY.

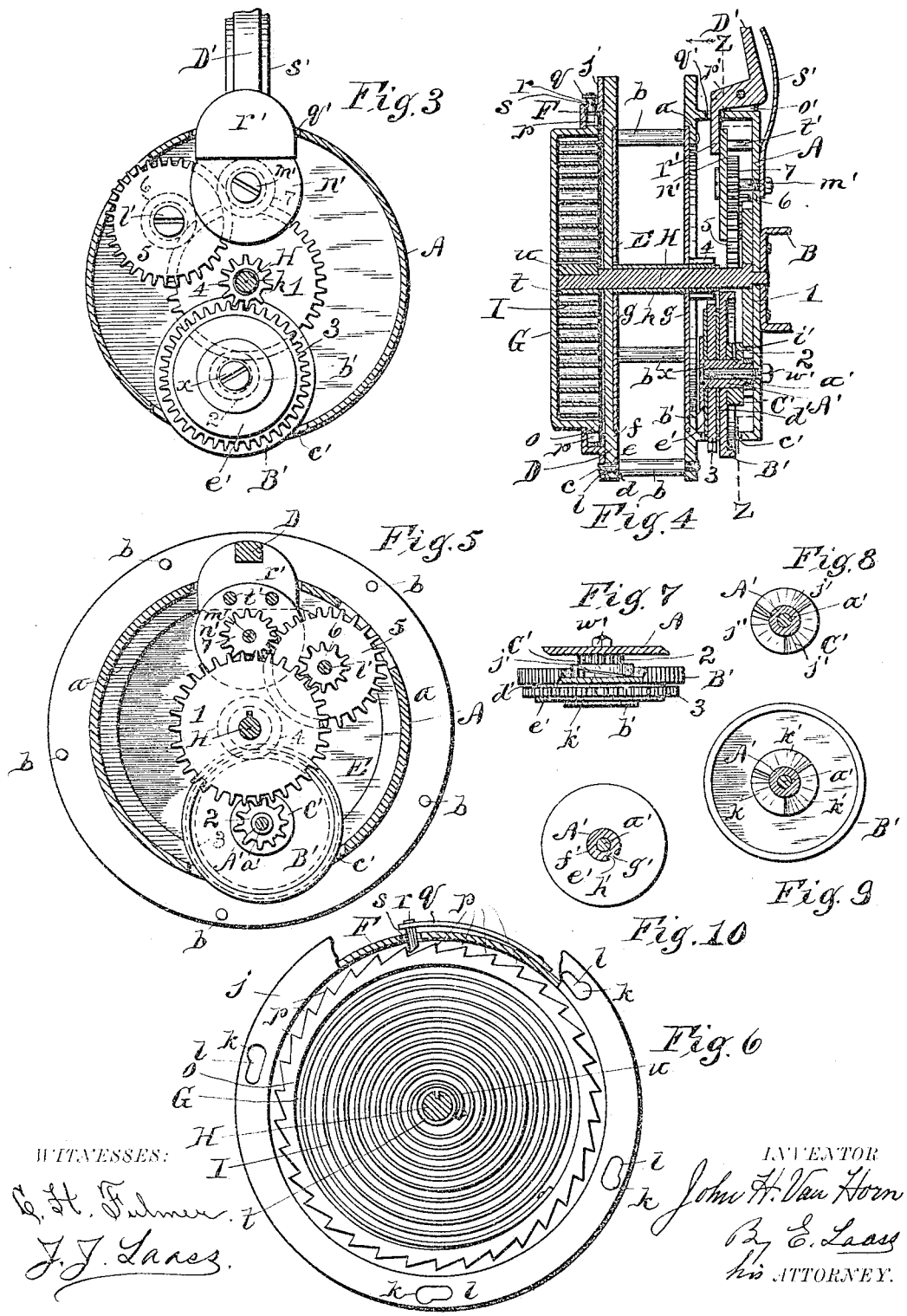

No. 787,317.

Patented April 11, 1905.

UNITED STATES PATENT OFFICE.

JOHN H. VAN HORN, OF SYRACUSE, NEW YORK, ASSIGNOR, BY DIRECT AND MESNE ASSIGNMENTS, TO ONEIDA FISHING REEL CO., A CORPORATION OF NEW YORK.

AUTOMATIC FISHING-REEL.

SPECIFICATION forming part of Letters Patent No. 787,317, dated April 11, 1905.

Application filed October 24, 1904. Serial No. 229,705.

*To all whom it may concern:*

Be it known that I, JOHN H. VAN HORN, of Syracuse, in the county of Onondaga, in the State of New York, have invented new and useful Improvements in Automatic Fishing-Reels, of which the following, taken in connection with the accompanying drawings, is a full, clear, and exact description.

This invention relates to the class of fishing-reels in which a spool is actuated automatically for winding the line thereon and controlled by a brake-lever.

The object of the present invention is to produce a reel of the aforesaid character which shall be simple, durable, and compact in its construction, very efficient in its operation, and at the same time inexpensive to manufacture.

Another object is to produce a reel which shall permit of quick and easy detachment and replacing of the line-spool for the purpose of allowing the substitution of other spools containing different kinds of lines, thereby obviating the necessity of removing the line from the spool.

Furthermore, an object of the invention is to provide the reel with means which can be quickly and conveniently manipulated for the purpose of permitting the line-spool to be rotated free and independent of its actuating mechanism, whereby the line may be freely unwound therefrom when desired.

Various other objects are attained by my invention, as will be apparent in the novel construction and combination of the component parts of the reel hereinafter fully described, and set forth in the claims.

In the accompanying drawings, Figure 1 illustrates a side view of an automatic fishing-reel embodying my invention and shows the same attached to the usual pole. Fig. 2 is a front view of the same. Figs. 3 and 4 are vertical sections taken on the dotted lines X X and Y Y in Figs. 1 and 2, respectively, the line being removed in Fig. 4. Fig. 5 is a vertical section taken on the dotted line Z Z in Fig. 4 viewed toward the front. Fig. 6 is a detached inner face view of the spring-winding drum and its retaining-ring broken away to better illustrate the pawl and ratchet connected with the drum. Fig. 7 is a detail view of the means which is manipulated to release the line-spool from the action of the train of gears to permit the spool to be rotated free and independent. Figs. 8 and 9, respectively, are detached face views of the cam-collar and coöperating wheel forming part of the device for releasing the spool from and locking it to the actuating mechanism. Fig. 10 is a detached face view of one of the clamping-disks of the said device. Fig. 11 is a fragmentary view, partly in section, showing the means for locking the retaining-ring which holds the annular plate on the case and the spring-winding drum on the plate; and Fig. 12 is a detail view showing the kerfed end portion of one of the studs or pins projecting from the case, on which studs the aforesaid plate is mounted.

Referring to the drawings, A denotes an annular case, which may be of any suitable style or size and is provided with the usual bracket B, by which it is detachably secured to the pole C in the well-known manner. This case is formed with circumferential journal-ring $a$ on its front, and from said ring rigidly project a plurality of studs or pins $b$ $b$, which have their outer ends reduced, as indicated at $c$, to form shoulders $d$ $d$.

D denotes an annular plate disposed concentric with the case A and provided with apertures $e$ $e$, receiving through them the said reduced end portions of the studs, whereby the said plate is seated on the said shoulders $d$ $d$, thus leaving a sufficient space between the said plate and case to accommodate the line-spool E, as clearly shown in Figs. 1 and 4 of the drawings. These apertures are disposed in a ring $f$ formed on the plate, which ring corresponds with the aforesaid ring $a$ of the case, between which rings the line-spool is confined. On the said spool E is wound the fish-line in the usual well-known manner. This spool consists of two annular disks $g$ $g$, rigidly connected by a tubular hub $h$, which latter projects from the inner disk, and the said spool is rotatably supported on a revoluble spindle H, journaled in the case and aforesaid plate B. The aforesaid end portions of the studs $b$ $b$ are provided with kerfs, as indicated at $i$, and disposed at the outer face of the plate D.

F denotes a retaining-ring which is formed with a flange $j$, bearing on the said outer face of the plate and provided with eyes $k$ $k$ for the reception of the said ends of the studs. From these eyes extend slots $l$ $l$, disposed concentric to the ring, so as to engage the aforesaid kerfs $i$ $i$ when the retaining-ring is rotated, whereby the plate is held in its position on the studs. To lock the flange of the retaining-ring in its engagement with the pins or studs, I provide a spring-plate $v$, fastened to the outer face of the flange, to which plate is secured a pin $w$, passing through an eye $m$ in the flange and engaging a coinciding eye or socket $n$ provided in the plate D, as clearly shown in Figs. 2 and 11 of the drawings.

G represents the revoluble spring-winding drum provided with a circumferential flange $o$, which is engaged by the aforesaid retaining-ring F, whereby the said drum is supported on the plate D, and said flange is provided with ratchet-teeth $p$ $p$, as clearly shown in Figs. 4 and 6 of the drawings. To the outer periphery of the said retaining-ring F is fastened a spring $q$, to which is secured a pawl $r$, passing through an aperture $s$ in the ring and engaging the aforesaid ratchet-teeth of the drum, as shown in Fig. 6. I denotes a coiled spring disposed in the said drum and fastened at its ends to the drum and spindle, respectively. The rotation of the drum G serves to wind the spring I, and said spring is prevented from unwinding by the engagement of the pawl $r$ with the ratchet-teeth $p$ $p$, as shown in Fig. 6 of the drawings. To permit the drum and attached spring to be readily removed, I rigidly attach the inner end of the spring to a sleeve or collar $t$, which surrounds the spindle and is provided with an internal tongue or lip $u$, engaging a corresponding longitudinal groove in the spindle, as clearly shown in Fig. 6 of the drawings. This arrangement allows the said sleeve or collar to be slipped off from the spindle for the purpose aforesaid.

In the said case A is supported a train of gears actuated by the aforesaid spring and the devices controlling the action thereof, which will now be described.

To the inner end of the spindle H is secured a main gear 1, which meshes with a pinion 2, secured to a sleeve or hollow post A', supported revolubly on an arbor $a'$, rigidly fastened to the case. This arbor is of the form of a bolt screwed into the back of the case and held thereon by a nut $w'$. The said bolt is preferably provided with a screw-head $x$, countersunk in a socket provided in a head $b'$, formed on the outer end of the post, as clearly shown in Fig. 4 of the drawings. On said post is loosely mounted a large gear 3, which meshes with a pinion 4, secured to the hub $h$ of the aforesaid line-spool E.

B' denotes a wheel which is also loosely mounted on the post and projecting through an aperture $c'$ in the case to permit the same to be manipulated by hand for the purpose shortly explained.

Between the wheel B' and gear 3 is disposed a flexible clamping-disk $d'$, and between the said gear and the head $b'$ of the post is disposed a like disk $e'$. Each of these clamping-disks is provided with a central opening $f'$, through which the post passes, and from the edge of the opening projects a lug $g'$, engaging a longitudinal groove or channel $h'$ in the post, whereby said disks are caused to rotate with the post.

C' denotes a collar rigidly fastened to the post in any suitable manner, preferably by means of a pin $i'$. Said collar is disposed close to the aforesaid wheel B' and is provided on its adjacent face with cam or wedging surfaces, as indicated at $j'$ $j'$, and which are arranged to be engaged by correspondingly-shaped projections $k'$ $k'$, formed on the face of the wheel, as clearly shown in Figs. 7 and 8 of the drawings. By turning the wheel B' in one direction the said cam or wedging projections thereof are caused to engage the corresponding surfaces of the collar C', whereby the said wheel is shifted slightly toward the gear 3. This shifting movement of the wheel and resultant outward pressure of the clamping-disk $d'$ on the gear 3 causes the said gear to be firmly gripped between the two clamping-disks, thereby locking the gear to the post. By locking the gear in the described manner the line-spool is caused to be rotated in one direction when the spindle H is actuated by the aforesaid spring I, thereby winding the line thereon.

5 denotes an auxiliary gear which is journaled on an arbor $l'$, secured to the case A, to which gear is fastened a pinion 6, meshing with the main gear 1. Said auxiliary gear 6 meshes with a pinion 7, secured to an annular friction-plate $n'$, which is loosely journaled on an arbor $m'$, secured to the case.

D' represents a manually-operated lever which is pivoted between ears $o'$ $o'$, fastened to the exterior of the case A. Said lever is provided with an extension $p'$, passing through an aperture $q'$ in the case, which extension terminates with a brake-block $r'$, disposed adjacent to the aforesaid friction-plate $n'$.

$s'$ denotes a suitable spring rigidly attached at one end to the exterior of the case and bearing with its free end on the back of the lever D', as clearly shown in Fig. 1 of the drawings. This spring forces the lever outward and causes the brake-block to press firmly onto the friction-plate $n'$, whereby the aforesaid gearing is restrained from action in opposition to the coiled spring I, connected to the spindle as described.

To the case A are rigidly secured short friction posts or pins t' t', between which posts and brake-block the plate p' is gripped. By operating the lever D' to relieve the said plate from the grip of the block and post the gearing is released, whereby the spring I is allowed to uncoil to cause it to impart rotary motion to the spindle, which in turn transmits winding rotation through the aforesaid pinion 2, post A', gear 3, and pinion 4 to the spool. In order to permit the spool to be rotated in the reverse direction free and independent of the spindle for the purpose of allowing the line to be readily unwound, the aforesaid wheel B' is to be turned to cause the wedging projections k' k' thereof to disengage the cam or wedging surfaces of the collar C', whereby the gear 3 is released from the grip of the clamping-plates d" c' and allowed to turn on the post A'. This release of the gear 3 and meshing pinion 4, fastened to the spool, allows the line to be readily withdrawn from said spool. It will be understood that when the desired length of line is withdrawn the said wheel is to be manipulated to cause the gear 3 to be locked to the post A' in the manner aforesaid to effect the connection of the spool with the spring-actuated spindle, whereby the spool shall be automatically rotated by the gears when the latter are released by brake-lever D', and thereby winding the line thereon.

It will be seen that when it is desired to detach spring-winding drum G and plate D to permit the removal of the line-spool for the purpose of substituting another spool containing a different kind or size of line or for other reasons the retaining-ring F can be quickly and conveniently unlocked by simply withdrawing the pin *r* from the eye or socket *n* in the plate and then turning the ring slightly to cause the slots *l l* to disengage the kerfs in the studs *b b*, whereby the latter are permitted to pass through the eyes *k k*, communicating with said slots.

What I claim is—

1. In a fishing-reel, the combination of a case, a revoluble spindle supported centrally in the case, a line-spool supported revolubly on the spindle, a spring actuating the spindle, means for winding the spring, mechanism imparting winding rotation from the spindle to the spool, manually-operated means independent of the spring-winding means for disconnecting the spool from the spindle to permit free and independent rotation of said spool, and a suitably-arranged brake-lever controlling the action of said mechanism as set forth.

2. In a fishing-reel, the combination of a case, a revoluble spindle projecting from the case, a line-spool supported rotatably on the spindle, a train of gears supported in the case and connecting said spool and spindle and imparting winding rotation thereto, a suitably-supported coiled spring actuating said gears, means for winding the spring, manually-operated means connected to the gearing independent of the spring-winding means and serving to disconnect the spool from the spindle to permit free and independent rotation of the spool, a friction-plate connected to one of the gears, and a brake-lever pivoted to the case and directly engaging said friction-plate to control the action of the gears in opposition to the spring, as set forth.

3. In a fishing-reel, the combination of an annular case, provided with a plurality of rigidly-projecting studs, a suitably-supported revoluble spindle projecting from the case, an annular plate disposed concentric with and detachably secured to said studs, a line-spool supported rotatably on the spindle, a train of gears connecting said spindle and spool and imparting winding rotation thereto, a coiled spring actuating said spindle, means for winding said spring, manually-operated means independent of the spring-winding means for throwing the spool out of gear to permit the same to be rotated independent of the spindle, a friction-plate connected to the train of gears, a lever pivoted to the case and provided with a brake-lock, and a spring engaging the lever and pressing the said brake-lock onto the friction-plate, as set forth.

4. In a fishing-reel, the combination of an annular case provided with a circumferential ring, a plurality of studs permanently projecting from said ring, an annular plate detachably secured to said studs and provided with a corresponding ring, a spring-actuated revoluble spindle journaled on the case and plate, a removable line-spool confined between said plate and case and supported rotatably on said spindle, mechanism supported in the case and imparting winding rotation from the spindle to the spool, a drum for winding the spring, manually-operated means independent of the winding means for relieving the spool from the action of said mechanism to permit free and independent rotation of the spool, and means controlling the winding action of said mechanism, as set forth.

5. In a fishing-reel, the combination of an annular case provided with a circumferential ring and a plurality of rigid studs, an annular plate detachably secured to said studs and provided with a corresponding ring, a revoluble spindle journaled in the case and plate, a removable line-spool supported rotatably on said spindle, a train of gears supported in the case and imparting winding rotation from the spindle to the spool, manually-operated means connected to the gearing serving to permit independent rotation of the spool, a suitably-supported coiled spring actuating said spindle, means for winding said spring, a rotatable friction-plate connected to one of said gears, and a spring-pressed brake-lever pivoted to the case and provided with means for engaging said plate for controlling the action of the gears in opposition to the spring, as set forth.

6. In a fishing-reel, the combinaation of an annular case provided with a plurality of rigid studs, a plate arranged concentric with the case and supported removably on the studs with a space between the same, means for locking the plate on the studs, a suitably-journaled removable line-spool confined between the plate and case, spring-actuated mechanism imparting winding rotation to the spool, spring-winding means, manually-operated means connected to the mechanism independent of the spring-winding means serving to permit independent rotation of the spool, and a brake-lever for controlling the action of the mechanism in opposition to the spring, as set forth.

7. In a fishing-reel, the combination of an annular case provided with a plurality of rigidly-projecting studs or pins, an annular plate supported removably on said studs, means engaging the studs for locking the plate in its position, a suitably-journaled removable line-spool confined between said plate and case, a train of gears supported in the case and connected to the spool and rotating the latter in one direction for winding the line thereon, manually-operated means for throwing the spool out of gear to permit free rotation thereof, a coiled spring actuating said gears, means independent of the gears for winding said spring, a friction-plate connected to one of said gears, and a spring-pressed lever pivoted to the case and provided with a brake-lock directly engaging said friction-plate to control the action of the gears in opposition to the coiled spring, as set forth.

8. In a fishing-reel, the combination of an annular case provided with a plurality of rigid circumferentially-arranged studs, a removable annular plate provided with coinciding apertures receiving the ends of the studs and supported thereon, a retaining-ring disposed at the outer face of the plate and provided with means engaging the studs for locking the plate thereto, a suitably-journaled line-spool confined between the said case and plate, spring-actuated mechanism imparting winding rotation to said spool, spring-winding means, manually-controlled means, independent of said spring-winding means serving to permit free and independent rotation of the spool, and a manually-operated brake-lever extending into the case for controlling the winding action of said mechanism, as set forth.

9. In a fishing-reel, the combination of an annular case, provided with a plurality of studs, a plate supported removably on the studs, a revoluble spindle journaled in the case and plate, a line-spool supported rotatably on said spindle and confined between the plate and case, a train of spring-actuated gears supported in the case and imparting winding rotation from the spindle to the spool, manually-controlled means connected to the gearing serving to permit free and independent rotation of the spool, a brake-lever for controlling the winding action of the gears, a removable plate-retaining ring engaging the aforesaid studs and means for locking said ring to the plate, as set forth.

10. In a fishing-reel, the combination of an annular case, provided with a plurality of rigid studs, an annular plate disposed concentric with the case and supported removably on the outer ends of said studs, means engaging the studs for retaining the plate in its position, a revoluble spindle journaled in the case and plate, a removable line-spool supported rotatably on said spindle, a spring actuating said spindle, means for winding the spring, a train of gears supported in the case and connecting said spindle and spool and imparting winding rotation to the latter, manually-operated means connected to the gears independent of the spring-winding means serving to permit the spool to be rotated independently of the spindle, and means for controlling the winding action of the gears, as set forth.

11. In a fishing-reel, the combination of an annular case provided with a circumferential ring and with studs projecting from the ring, an annular concentric plate supported removably on said studs and formed with a corresponding ring, a revoluble spindle journaled in the case and plate, a removable line-spool supported rotatably on the spindle and confined between said rings, a train of gears supported in the case and connecting spindle and spool and imparting winding rotation to the spool, manually-operated means connected to the gearing and serving to permit free and independent rotation of the spool, a drum mounted revolubly on the plate, a retaining-ring sustaining the drum, a coiled spring attached at its respective ends to the interior of the drum and outer end of the spindle and operative for rotating the latter, ratchet-teeth on the drum, a pawl supported on the retaining-ring and engaging said ratchet-teeth, a friction-plate directly attached to one of the aforesaid gears, and a spring-pressed brake-lever pivoted to the case and provided with means for directly engaging the said friction-plate to control the winding action of the gears in opposition to the coiled spring, as set forth.

12. In a fishing-reel, the combination of a case, provided with studs, a plate supported removably on said studs, a revoluble spindle journaled in the case and plate, a line-spool supported rotatably on the spindle and confined between the case and plate, a train of gears supported in the case and transmitting winding motion from the spindle to the spool, manually-operated means acting upon the gears to permit free and independent rotation of the spool, a revoluble drum disposed on the outer face of the plate, a retaining-ring engaging the ends of the aforesaid studs and supporting the drum, means for locking the ring to the studs, a coiled spring within the drum and connected at its respective ends to the spindle and drum, ratchet-teeth on the drum, a pawl supported on the retaining-ring and engaging said ratchet-teeth, a rotary friction-plate connected to one of the gears, and a lever pivoted to the exterior of the case and extending into the same and provided with a brake-lock directly engaging said friction-plate to control the winding action of the gears, as set forth.

13. In a fishing-reel, the combination of an annular case provided with a plurality of rigidly-projecting studs formed with reduced outer end portions having kerfs, an annular plate provided with apertures receiving through them said reduced end portions of the studs, a revoluble drum disposed on the outer face of the plate and provided with a flange having ratchet-teeth, a retaining-ring provided with eyes receiving the aforesaid ends of the studs and with slots extending from the eyes whereby the rotation of said ring causes said kerfs to engage said slots to hold the plate in its position, a socket in the plate, a spring-plate fastened to the retaining-ring and provided with a pin for engaging the socket to lock the slots in their engagement with the kerfs, said ring loosely engaging the flange of the drum to support the latter, a spring attached to the ring and provided with a pawl engaging the aforesaid ratchet-teeth, a spindle supported revolubly in the case and plate, and extending into the drum, a coiled spring attached to the drum and spindle, a train of gears connecting said spindle and spool and imparting winding rotation to the latter, and means for controlling the action of said gears, as set forth.

14. In a fishing-reel, the combination of the case, a revoluble spindle supported in the case, a line-spool supported rotatably on the spindle, a coiled spring actuating the spindle, mechanism comprising a main gear fastened to the spindle, a pinion fastened to the spool, a post revolubly supported in the case, a pinion secured to the post and engaging the main gear, a gear loosely mounted on the post and engaging the spool-pinion to permit the spool to be rotated free and independent of the spindle, manually-operated means for locking the said gear to the post to cause the spool to be rotated in winding direction by the spindle and gears through the unwinding of the aforesaid spring, manually-operated means for controlling the winding rotation of the spool, and means for winding the said spring, as set forth.

15. In a fishing-reel, the combination of a case, a revoluble spindle supported in the case, a coiled spring actuating said spindle, means for winding the spring, a line-spool journaled on said spindle, mechanism comprising a main gear fastened to the spindle, a revolubly-supported post in the case, a pinion fastened to the post and engaging said gear, a pinion fastened to the spool, a gear mounted loosely on the post and engaging the spool-pinion, manually-operated clamping means independent of the spring-winding means attached to the post and serving to lock the loose gear to and unlock it from the post to cause the spool to be rotated in one direction with the spindle through the unwinding of the spring and to permit the spool to be rotated free and independently of the spindle, and a brake-lever for controlling the action of the gears in opposition to the spring, as set forth.

16. In a fishing-reel, the combination of a case, a revoluble spindle supported in the case, a line-spool supported revolubly on the spindle, a coiled spring actuating said spindle, means for winding the spring, mechanism comprising a main gear fastened to the spindle, a revolubly-supported post in the case, a pinion fastened to the post and engaging said gear, a pinion fastened to the spool, a gear loosely mounted on the post and engaging the latter pinion, flexible clamping-disks connected with the post and disposed at opposite sides of the loose gear, a cam-collar fastened to the post, a manually-actuated wheel loosely mounted on the post and provided with wedging projections on one face engaging the cam-collar and bearing with its opposite face against one of the clamping-disks, and by said engagement causing the clamping-disks to lock the aforesaid gear to the post, and release it therefrom to permit the spool to be rotated independent of the spindle, a supplemental gear journaled in the case, a pinion fastened to the latter gear and engaging the main gear, another suitably-journaled pinion connected to the supplemental gear, a friction-plate fastened to the latter pinion, and a lever pivoted to the case and provided with means engaging said friction-plate for the purpose set forth.

JOHN H. VAN HORN.

Witnesses:
J. J. LAASS,
L. H. FULMER.